US012736420B1

(12) United States Patent
Alameh et al.

(10) Patent No.: US 12,736,420 B1
(45) Date of Patent: Sep. 15, 2026

(54) CAPACITIVE MAT FOR DETECTING PLACEMENT OR REMOVAL OF ITEMS

(71) Applicant: AMAZON TECHNOLOGIES, INC., Seattle, WA (US)

(72) Inventors: Rachid M. Alameh, Crystal Lake, IL (US); Jiri Slaby, Seattle, WA (US); Gregory Donald Hager, Springfield, VA (US); Thomas Keenan, Seattle, WA (US); Jonathan Guy, Austin, TX (US); Nir Charny, North Grafton, MA (US); Nathan P. O'Neill, Bainbridge Island, WA (US); Frederick Hershel Savage, Austin, TX (US); Amelia Capilongo, Leesburg, VA (US); Alexander Eugene Choi, Seattle, WA (US); David Bryan Michelman, Seattle, WA (US); Jonathan Alan Jenkins, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 242 days.

(21) Appl. No.: 18/618,796

(22) Filed: Mar. 27, 2024

(51) Int. Cl.
*G01L 1/14* (2006.01)
*G06Q 10/087* (2023.01)

(52) U.S. Cl.
CPC ............ *G01L 1/146* (2013.01); *G06Q 10/087* (2013.01)

(58) Field of Classification Search
CPC ....... G06Q 10/087; G01L 1/146; G01L 1/205; G06F 3/044; G06F 3/04186; G06F 1/1626; G06F 3/0412; G06F 3/0416; G01D 5/2403; G01G 3/12; G06T 1/00; A61F 2/50; A61B 5/1117; A61B 5/1036; B60N 2/0025; G01V 3/088; B60R 21/0154; G01R 1/07; E05F 15/73
See application file for complete search history.

(56) References Cited

U.S. PATENT DOCUMENTS

| | | | | |
|---|---|---|---|---|
| 2014/0090489 A1* | 4/2014 | Taylor | G01L 1/00 73/862.626 |
| 2018/0261559 A1* | 9/2018 | Doyle | H10W 42/405 |
| 2019/0036527 A1* | 1/2019 | Dolcetti | H03K 17/962 |

* cited by examiner

*Primary Examiner* — Brandi N Hopkins
(74) *Attorney, Agent, or Firm* — Weaver Austin Villeneuve & Sampson LLP

(57) ABSTRACT

A capacitive mat includes a first set of conductors that function as sensing electrodes applied to a first side of a substrate and a second set of conductors that function as shield electrodes applied to a second side of the substrate. Upper and lower exterior layers are placed over the sets of conductors. The substrate and the exterior layers may be formed from flexible materials. Circuitry in the mat determines a capacitance associated with the conductors at a region of the mat that is associated with an object on the mat. To reduce thickness and improve flexibility, the shield electrodes may be used to determine a ground reference value and use of separate ground electrodes may be omitted. Conductive regions on the mat may be used to couple with adjacent mats, allowing several mats to be easily combined to cover a larger surface.

20 Claims, 7 Drawing Sheets

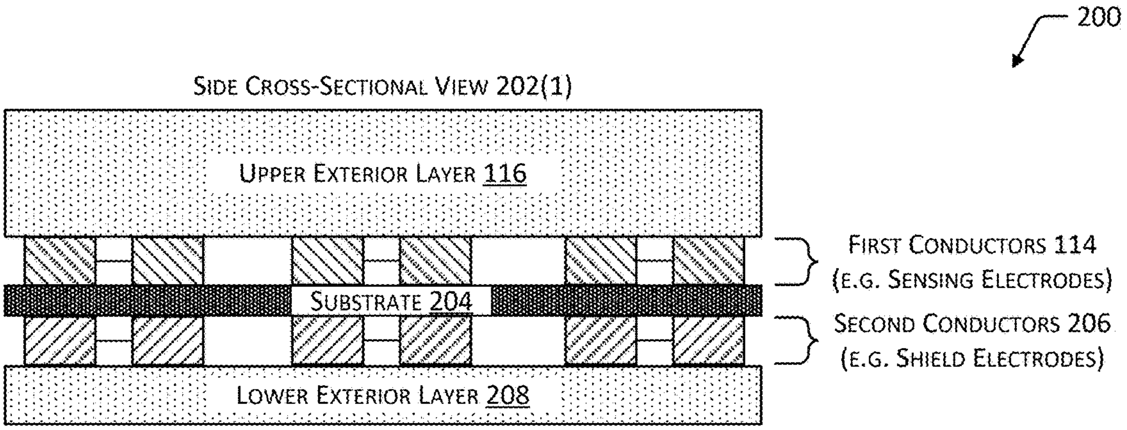

FIG. 2A

Side Cross-Sectional View 202(2)

Upper Exterior Layer 116

First Conductors 114 (E.G. Sensing Electrodes)

Substrate 204

Second Conductors 206 (E.G. Shield Electrodes)

Rigid Material 210

Lower Exterior Layer 208

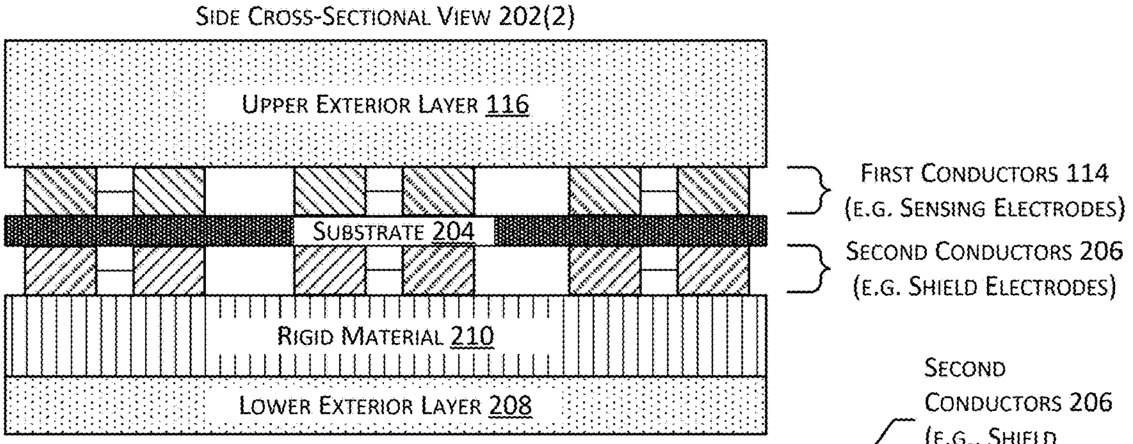

FIG. 2B

Side Cross-Sectional View 202(3)

Upper Exterior Layer 116

Second Conductors 206 (E.G., Shield Electrodes)

First Conductors 114 (E.G., Sensing Electrodes)

Substrate 204

Distance D1

Spacing Material 214

Distance D2

Lower Exterior Layer 208

Third Conductors 212 (E.G., Ground Electrodes)

Z

Y

X

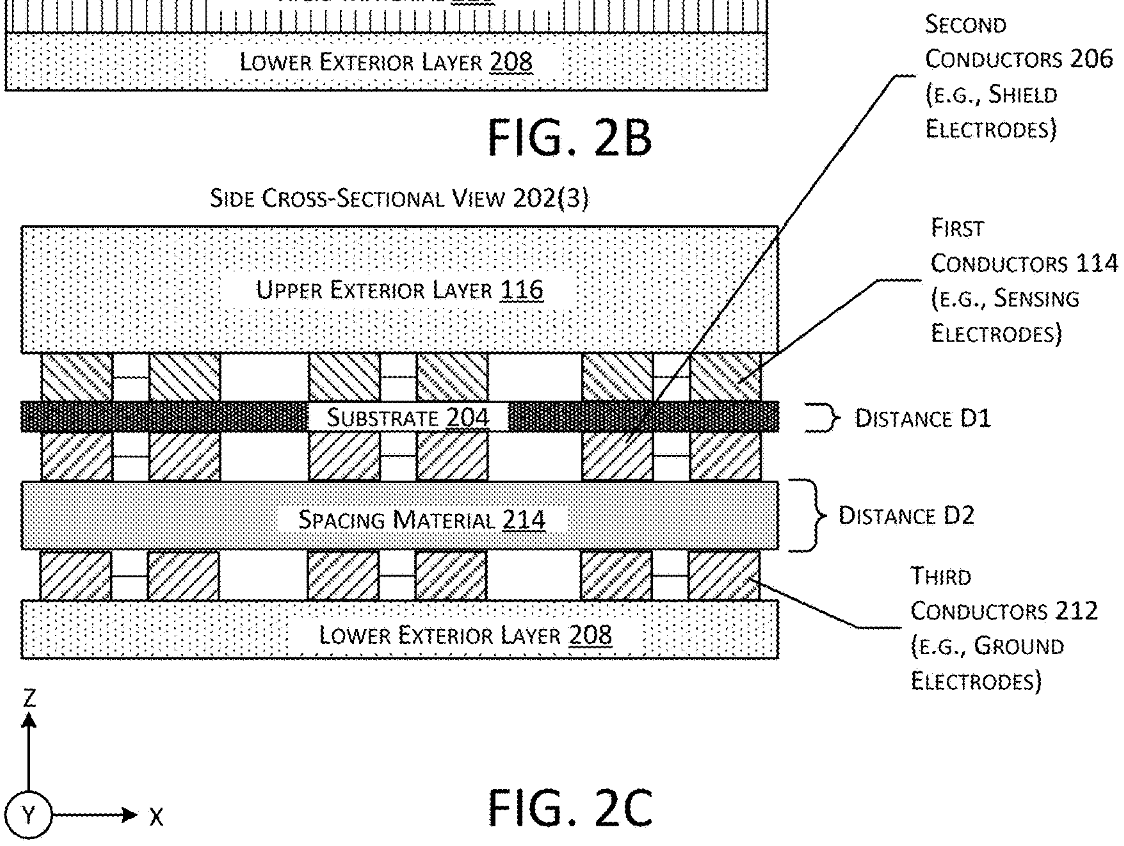

FIG. 2C

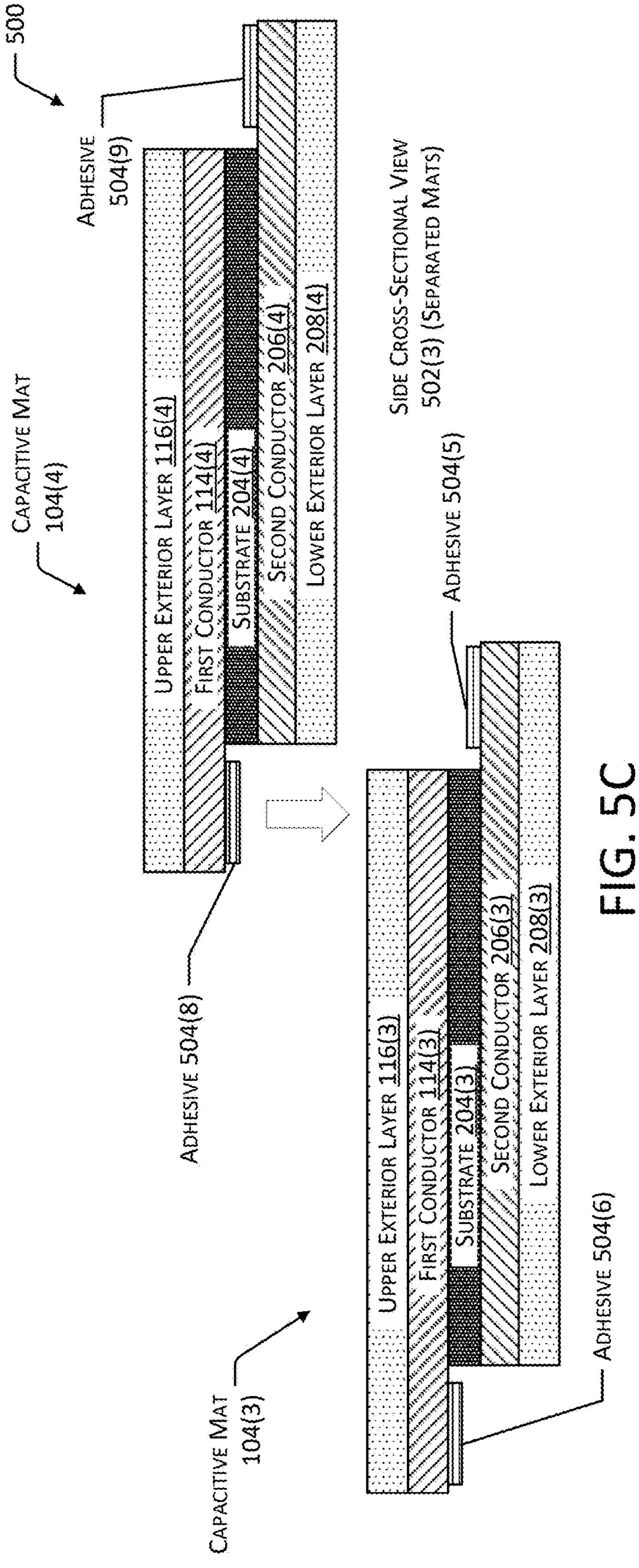
FIG. 5C
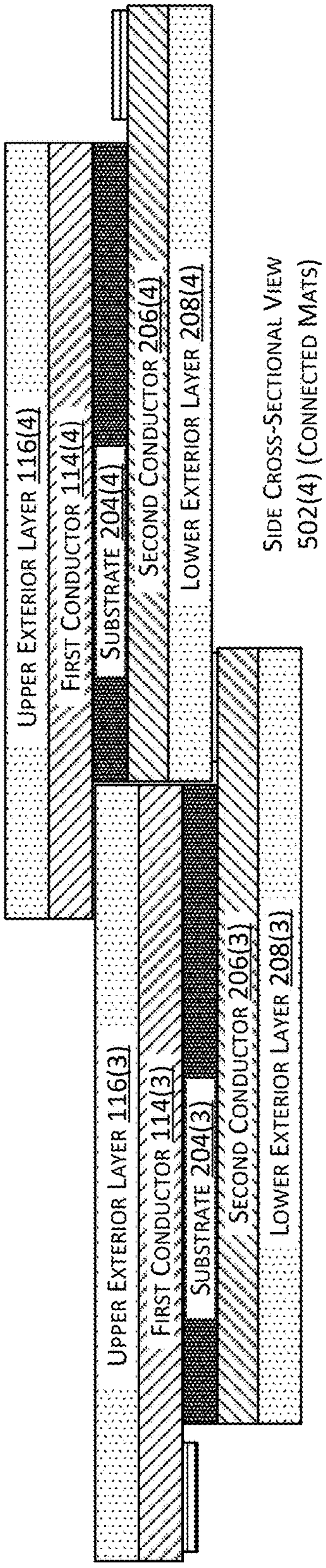
FIG. 5D
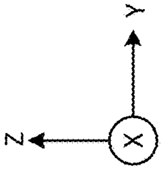

CAPACITIVE MAT FOR DETECTING PLACEMENT OR REMOVAL OF ITEMS

BACKGROUND

Retailers, wholesalers, distributors, and other entities typically maintain an inventory of items that are available for order, purchase, lease, subscription, viewing, and so forth. For example, an online store may maintain inventory in a fulfillment center, warehouse, or other type of storage facility. When an item is ordered by a customer, the item is picked from inventory and shipped to the customer. As another example, a physical store may maintain inventory in an area accessible to customers, such as a shelf in a shopping area, and customers may pick items from the shelf for purchase. Monitoring the types and quantities of items at different locations within a facility, which may be facilitated using various sensors, may facilitate maintaining inventory, and fulfilling orders for the item.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIGS. 2A-2C are diagrams depicting side cross-sectional views (along line A-A of FIG. 1) of implementations of arrangements of components of capacitive mats within the present disclosure.

FIGS. 5A-5D are diagrams depicting side cross-sectional views of implementations of capacitive mats that may be coupled with other capacitive mats.

Figure 1:
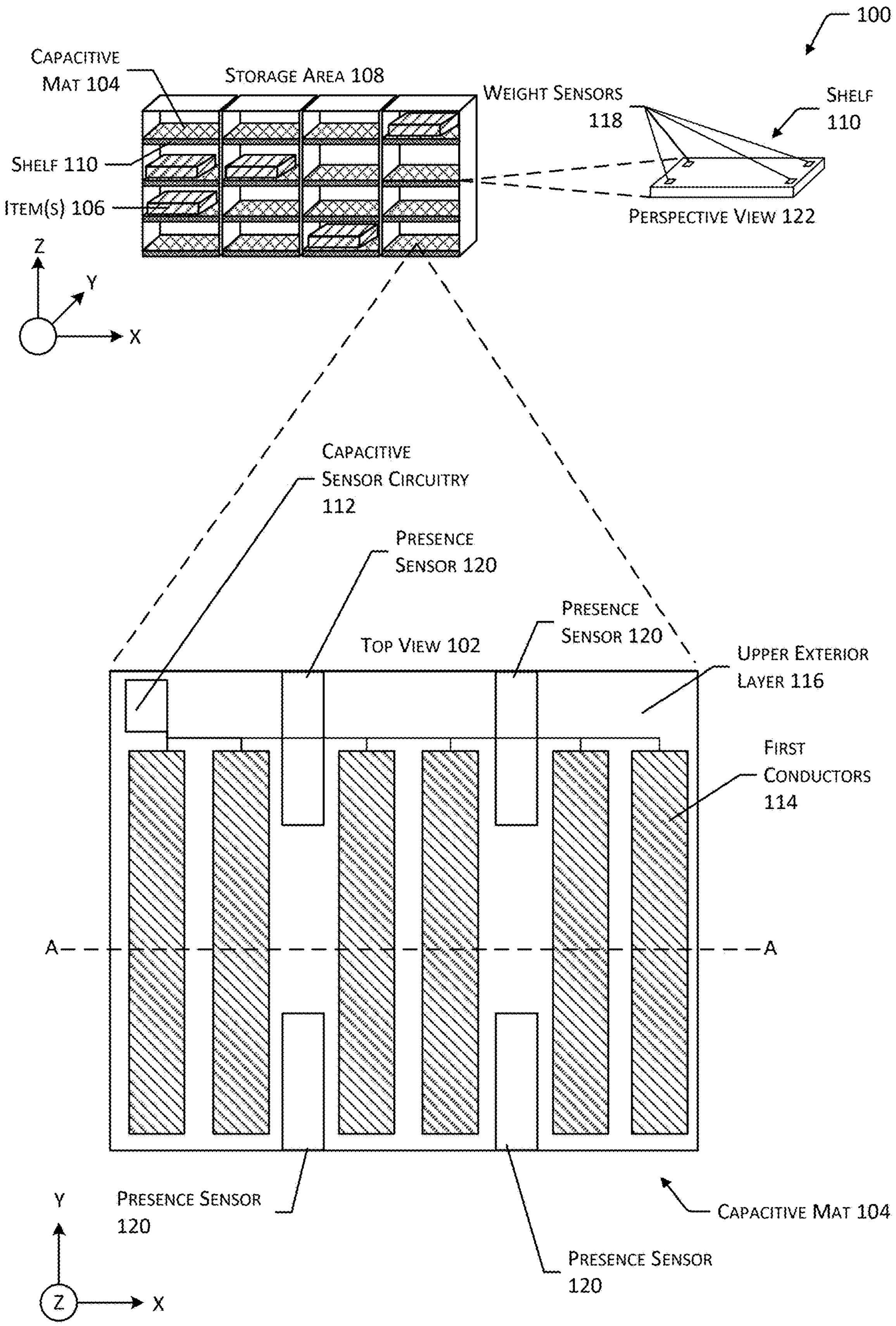
FIG. 1 is a diagram depicting a top view of an implementation of a capacitive mat within the present disclosure.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Described in this disclosure are systems that may be used to determine the position and other characteristics of objects at a storage area or other location. The systems may include one or more mats that may be used as sensors to acquire data about objects positioned on the mat(s). For example, when an object is placed on or removed from a mat, this may cause a change in capacitance associated with electrodes within the mat. Data acquired from the mat may indicate this change, which may be used to determine a location at which an object was placed or removed, and in some cases, a weight or identity of the object. The mat may include a first set of conductors and a second set of conductors that are each connected to capacitive sensor circuitry. The capacitive sensor circuitry may determine a capacitance associated with particular conductors at a region of the mat, which may be indicative of the placement or removal of an object at that region of the mat.

In some implementations, the mat may include one or more rigid materials. For example, the mat may include sets of conductors associated with a printed circuit board (PCB). In other implementations, the mat may be a flexible device. For example, the mat may include a flexible substrate formed from one or more plastics, polymers, and so forth. The first set of conductors may be placed on a first side of the flexible substrate, such as by printing, laminating, adhering, depositing (e.g., via vapor deposition or another process), or otherwise applying or placing conductive material on the substrate. The second set of conductors may be placed on a second side of the substrate opposite the first side. For example, placement of the conductors may include depositing a conductive material, such as copper or carbon, on respective sides of the substrate. In some implementations, adhesive material on the substrate may be used to limit relative movement (e.g., lateral or sheer movement) between the first and second sets of conductors, or the substrate may itself be an adhesive material.

Flexible exterior coverings may be placed external to the sets of conductors. For example, an upper exterior covering may be placed over the first set of conductors such that the first set of conductors is between the substrate and the upper exterior covering. Objects may then be placed on and removed from locations on the upper exterior covering. A lower exterior covering may be placed over the second set of conductors, such that the second set of conductors is between the substrate and the lower exterior covering. The lower exterior covering may be placed against a surface, such as a shelf or other structure upon which objects may be stored. Capacitance associated with regions of the mat may be determined by applying one or more signals to the conductors, such that the first set of conductors function as sensing electrodes and the second set of conductors function as shield electrodes. To facilitate flexibility of the mat, a separate set of ground electrodes may be omitted, and the circuitry may determine a ground reference value associated with the second set of conductors that function as shield electrodes.

In other implementations, the mat may include one or more third conductors that function as ground electrodes, and a ground reference value associated with the third set of conductors may be determined. In some cases, a distance between the ground electrode(s) and the sensing electrode(s) may cause an electrical field associated with the conductors to extend a distance above the mat that may detect the presence of objects located farther from the mat, such as if a second object is stacked on top of a first object.

In some implementations, to limit relative movement between the mat and the surface on which the mat is placed, the mat may be secured to the surface, such as through use of one or more adhesives or mechanical fasteners. Securing the mat to a conductive surface, such as a metal shelf, may enable the conductive surface to be used to determine a ground reference value. Use of a metal shelf or other conductive underlying surface as a ground electrode may enable the capacitive mat to have a simpler and thinner construction in which components that function as ground electrodes and components that limit movement of the conductors relative to the underlying surface are not needed due to adhesively or mechanically securing the mat to the underlying shelf and use of the shelf as a ground electrode. In other implementations, such as implementations in which the mat is not adhesively or mechanically secured to an underlying surface, the mat may include a layer of rigid material, such as a layer of copper, which may limit movement of the conductors relative to the surface. In cases where the layer of rigid material includes a conductive material, the conductive material may be floating (e.g., not electrically connected to the circuitry, the first set of conductors, or the second set of conductors), or may be electrically coupled to one or more components of the capacitive mat. In some cases, the surface on which the mat is placed may include an electrically conductive material. For example, the surface may be a metal shelf, or a shelf formed from metal or another conductive material having a non-conductive coating. In some implementations, the shelf may include one or more weight sensors. Data from the weight sensors may be indicative of an object that is placed on or removed from the mat that is placed on the shelf. Data from the weight sensors, in combination with the capacitance determined using the mat, may be used to determine characteristics of one or more objects that were placed on or removed from the mat, which in some cases may be used to identify the objects that were moved. In some implementations, placement of the mat on a metal shelf of other surface may enable the mat to have a thin construction. For example, a mat may include a single layer of substrate material having two sets of electrodes on opposite sides thereof, secured to a shelf or other surface.

In some implementations, the mat may include one or more contact regions that are connected to the conductors and are positioned near one or more edges of the mat. For example, the outer layers of the mat may extend over a set of conductors but may not cover the contact regions, or may removably cover the contact regions. These contact regions may capacitively or electrically couple with contact regions on an adjacent mat, enabling multiple mats to be used to cover a larger portion of a shelf or other surface. Circuitry in a single mat or subset of the mats may be used to drive electrodes and determine capacitance for multiple mats. In some implementations, one or more edges of the mats may include adhesive to limit relative movement between mats that have been coupled together.

FIG. 1 is a diagram 100 depicting a top view 102 of an implementation of a capacitive mat 104 within the present disclosure. Features shown in FIG. 1 are not drawn to scale and may be exaggerated to facilitate comprehension of the components of the capacitive mat 104. The capacitive mat 104 may be used to determine the presence of one or more items 106 that may be placed on or removed from the capacitive mat 104, and in some cases, the particular region of the capacitive mat 104 on which an item 106 was placed or from which an item 106 was removed. For example, one or more capacitive mats 104 may be used in a storage area 108 where one or more items 106 may be stored. Continuing the example, a storage area 108 may include one or more shelves 110 or other surfaces where items 106 may be stored, and a capacitive mat 104 may be placed on one or more of the shelves 110 or other surfaces.

In some implementations, the shelf 110 on which a capacitive mat 104 is placed may include an electrically conductive material. For example, the shelf 110 may be formed from metal, or may include metal or another electrically conductive material having a coating that may not necessarily be electrically conductive. The material from which the shelf 110 is formed may affect the electrical fields generated by electrodes within the capacitive mat 104. In some implementations, a capacitive mat 104 may be adhesively or mechanically secured to a shelf 110, which may limit movement of the capacitive mat 104 relative to the shelf 110. Limiting movement of the capacitive mat 104 relative to the shelf 110 may reduce portions of a measured capacitance caused by the movement of conductors within the capacitive mat 104 that is not caused by placement or removal of an item 106. In other implementations, a capacitive mat 104 may be non-adhesively placed on a shelf 110 and may include one or more internal components, such as a layer of rigid material, that limits movement of conductors within the capacitive mat 104 that may be caused by movement of the capacitive mat 104 relative to the shelf 110.

As items are placed on or removed from various shelves 110, the capacitive mats 104 may act as sensors. For example, a signal indicative of a measured capacitance for a particular location on a capacitive mat 104 may indicate whether an item 106 is currently positioned at the particular location. Changes in measured capacitance for a particular location on a capacitive mat 104 may indicate whether an item 106 is placed on or removed from that location on the capacitive mat 104.

As described previously, the capacitive mat 104 may include at least two sets of conductors, connected to capacitive sensor circuitry 112. In the top view 102 shown in FIG. 1, a set of first conductors 114 are depicted beneath an upper exterior layer 116. While FIG. 1 depicts a top view 102 in which six first conductors 114 are shown to facilitate comprehension of the elements of the capacitive mat 104, the capacitive mat 104 may include any number of conductors. A set of second conductors (not shown in FIG. 1) may be positioned below the first conductors 114, and a lower exterior layer (not shown in FIG. 1) may be positioned below the second conductors. The lower exterior layer may be placed in contact with a shelf 110. Placement of items 106 on, or removal of items 106 from, a location on the upper exterior layer 116 may cause movement of one or more of the first conductors 114 or second conductors, or may affect an electrical field associated with the first conductors 114 and second conductors. For example, the capacitive sensor circuitry 112 may operate the first conductors 114 to function as sensing electrodes while the second conductors function as shield electrodes. In some implementations, the second conductors may also be used to determine a ground reference value. In other implementations, a third set of conductors that function as ground electrodes may be included within the capacitive mat 104 and used to determine the ground reference value.

The capacitive sensor circuitry 112 may determine a capacitance associated with at least one of the first conductors 114 and at least one second conductor, which may be indicative of placement of an item 106 on the capacitive mat 104 or removal of an item 106 from the capacitive mat 104. Output may be generated based on the determined capacitance. For example, output may be indicative of a particular location on a capacitive mat 104 or within the storage area 108, and in some cases, characteristics of the item 106 that may be determined based on the capacitance.

In some implementations, a shelf 110 may include one or more associated weight sensors 118 that may be used to determine one or more weight values associated with the shelf 110. For example, FIG. 1 depicts a perspective view 122 of an example implementation of a shelf 110 having a rectangular shape that includes four weight sensors 118 positioned at the corners of the shelf 110. Data from each of the weight sensors 118 may be used to determine characteristics of an item 106 that is placed on or removed from the shelf 110. For example, a change in the weight values associated with the shelf 110 may be used to determine the placement or removal of one or more items 106 and one or more characteristics of the item(s) 106, such as the weight(s) thereof. Data from individual weight sensors 118 may be used to determine a location on the shelf 110 where the item(s) 106 were placed or removed. Data from the weight sensors 118 may be used in combination with the capacitance determined using the capacitive mat 104 to determine characteristics of the item(s) 106 such as locations, weights, or other discernable characteristics. In some implementations, the determined characteristics of the item(s) 106 may be used to determine an identity of the item(s) 106 that were placed or removed.

Use of weight sensors 118 in combination with capacitance determined using the capacitive mat 104 may therefore enable additional characteristics of placement or removal of item(s) 106 to be determined that may not be readily determinable when using only weight sensors 118 or measured capacitance. For example, if multiple items 106 are stacked on one another, removal of an item may result in a significant change in weight determined using a weight sensor 118, but may not necessarily result in a significant change in capacitance measured using the capacitive mat 104. As another example, if multiple identical or similar items 106 are placed on or removed from a capacitive mat 104, or if lightweight items 106 are placed or removed, a significant change in weight may not necessarily be determined, however changes in capacitance may be used to determine locations where items 106 were placed or removed.

In some implementations, the capacitive mat 104 may include one or more presence sensors 120 positioned at or proximate to one or more edges of the capacitive mat 104. For example, a presence sensor 120 may include a capacitive sensor that may detect the touch or near-touch of a human hand or other object, such as when a human is placing one or more objects on the capacitive mat 104 or removing one or more objects from the capacitive mat 104. The presence sensor 120 may include a first electrode (e.g., a sensing electrode) positioned above a second electrode (e.g., a shield electrode), each electrode having a length configured to detect the presence of a human or other object within a range of approximately 12 inches. For example, the electrodes of the presence sensor 120 may have a length ranging from 6 to 8 inches. In some implementations, the electrodes of the presence sensor 120 may have differing widths. For example, the first electrode of the presence sensor 120 may have a width less than that of the second electrode positioned beneath the first electrode. In one implementation, the first electrode may have a width of 0.125 inches while the second electrode has a width of 0.25 inches. FIG. 1 depicts presence sensors 120 positioned on opposite edges of the capacitive mat 104. For example, presence sensors 120 positioned at a first edge of the mat may detect the presence of the body of a first type of user, such as a customer removing items 106 from a shelf 110, while presence sensors 102 positioned at an opposite edge of the mat may detect the presence of the body of a second type of user, such as a stocker placing items 106 on to the shelf 110. Signals from a particular presence sensor 120 may be used, in combination with a capacitance determined using the capacitive sensor circuitry 112, and in some cases in combination with values determined using weight sensors 118 associated with the shelf 110, to determine characteristics of placement or removal of items 106 from the capacitive mat 104. FIG. 1 depicts the presence sensors 120 positioned in an interleaved relationship relative to the first conductors 114. For example, the presence sensors 120 are shown positioned at the edge of the capacitive mat 104 at a location between adjacent first conductors 114. This arrangement of components may allow the first conductors 114 to have an increased size, which may increase the sensitivity of capacitive measurements, facilitate coupling capacitive mats 140 together, and so forth.

FIGS. 2A-2C are diagrams 200 depicting side cross-sectional views 202 (along line A-A of FIG. 1) of implementations of arrangements of components of capacitive mats 104 within the present disclosure. The elements shown in FIGS. 2A-2C are not drawn to scale and may be exaggerated to depict relationships between elements of the capacitive mat 104. FIG. 2A depicts a side cross-sectional view 202(1) of a first implementation of components of a capacitive mat 104. The capacitive mat 104 may include a substrate 204, which in some implementations may be formed from a flexible material. The set of first conductors 114 may be positioned on a first side of the substrate 204 such as by printing, laminating, adhering, depositing (e.g., via vapor deposition or another process), or otherwise applying or placing conductive material on the substrate 204. For example, the first conductors 114 may include one or more layers of paint or ink formed from a conductive material, such as silver, copper, carbon, or conductive plastic. In one implementation, the first conductors 114 may be formed from a layer of electrically conductive carbon having a thickness (e.g., along the Z axis of FIG. 2) of at least one micron. In other implementations, one or more of the first conductors 114 may be applied to the upper exterior layer 116 rather than to the substrate 204.

A set of second conductors 206 may be positioned on a second side of the substrate 204. The second conductors 206 may be applied using the same techniques described with regard to the first conductors 114 and may be formed from the same materials described with regard to the first conductors 114. A lower exterior layer 208 may be positioned over the second conductors 206. In some implementations, the second conductors 206 may be applied to the lower exterior later 208 rather than to the substrate 204. The substrate 204 may be formed from a non-conductive material (e.g., to prevent direct contact between the first conductors 114 and second conductors 206). In some implementations, the substrate 204 may include one or more adhesive materials, which may prevent relative movement, such as lateral movement or sheer movement (e.g., along the X or Y axes shown in FIG. 2), between the first conductors 114 and second conductors 206.

In some implementations, the upper exterior layer 116 and lower exterior layer 208 may be formed from a flexible material, which, in combination with the substrate 204 being formed from a flexible material, may enable the capacitive mat 104 to be generally flexible, cuttable, able to be rolled or folded, and so forth. Additionally, use of only the first conductors 114 and second conductors 206, while omitting a third set of conductors for use as ground electrodes, may enable the thickness of the capacitive mat 104 to be reduced. For example, in one implementation, the capacitive mat 104 shown in FIG. 2A may have a thickness (e.g., along the Z axis of FIG. 2) of approximately 1.7 millimeters (mm). In other implementations, the capacitive mat 104 may be formed from rigid materials, such as a printed circuit board (PCB).

In some implementations, use of a substrate layer may be omitted. For example, material to form one set of conductors may be applied to a corresponding exterior layer (e.g., one of the upper exterior layer 116 or lower exterior layer 208), a layer of non-conductive material may be applied over the conductors, then material to form the other set of conductors may be applied over the layer of non-conductive material. The other exterior layer (e.g., the other of the upper exterior layer 116 or lower exterior layer 208) may then be placed over the other set of conductors. As another example, respective sets of conductors may be applied to respective exterior layers, with a layer of non-conductive material applied over at least one set of conductors, and the respective sets of conductors may then be secured together, such as through use of adhesive material. In other implementations, the first conductors 114 and second conductors 206 may be encapsulated by a non-conductive material in addition to or in place of use of non-conductive materials in the substrate 204, upper exterior layer 116, and lower exterior layer 208 to prevent contact between adjacent conductors and between the conductors and an item 106 or shelf 110.

FIG. 2B depicts a side-cross sectional view 202(2) of an embodiment of a capacitive mat 104 that includes a layer of rigid material 210 positioned between the lower exterior layer 208 and the second conductors 206. The rigid material 210 may limit movement of the conductors within the capacitive mat 104 relative to the surface on which the capacitive mat 104 is placed, such as when the capacitive mat 104 is not adhesively secured to the surface and may be at least partially moveable relative to the surface. In some implementations, the rigid material 210 may include a layer of copper or another conductive material. The layer of copper or other conductive material may be floating (e.g., not electrically connected to the first conductors 114 or second conductors 206), or electrically coupled with one or more of the conductors. The rigid material 210 may electrically isolate the conductors of the capacitive mat 104 from an underlying conductive surface, such as a metal shelf 110. For example, inclusion of a conductive material may affect the electrical field associated with the first conductors 114 and second conductors 206. In other implementations, the rigid material 210 may include a non-conductive material. Additionally, in other implementations, the lower exterior layer 208 may be omitted and the rigid material 210 may function as an exterior layer. For example, the rigid material 210 may be positioned in contact with a shelf 110 or other underlying surface.

FIG. 2C depicts a side-cross sectional view 202(3) of an embodiment of a capacitive mat 104 that includes a set of third conductors 212 positioned between the second conductors 206 and the lower exterior layer 208. The third conductors 212 may function as ground electrodes (e.g., may be electrically separated from the first conductors 114 and second conductors 206) and may be used to determine a ground reference value or field return value in addition to or in place of the value(s) determined using the second conductors 206. In the implementation shown in FIG. 2C, the first conductors 114 are separated from the second conductors 206 by a first distance D1, while the third conductors 212 are separated from the second conductors 206 by a second distance D2, which in some implementations may be greater than the first distance D1. For example, a spacing material 214 such as an additional substrate or other non-conductive material, may be positioned between the second conductors 206 and the third conductors 212. In other implementations, the spacing material 214 may include extensions of the upper exterior layer 116, lower exterior layer 208, or substrate 204 that contact one of the other layers within the capacitive mat 104 to maintain a space between the second conductors 206 and third conductors 212. In such a case, the region denoted in FIG. 2C as spacing material 214 may include air. The spacing between the third conductors 212 and first conductors 114 may affect the shape and distance of the electric field associated with the first conductors 114 and second conductors 206. For example, the spacing of the third conductors 212 from the other conductors may reduce capacitive loading and cause the electric field to extend a greater height above the upper exterior layer 116. Continuing the example, the depicted arrangement of conductors may enable a capacitance value to be determined that may indicate the presence, placement, or removal of an object from above the upper exterior layer 116, such as a second object stacked on top of a first object that is placed in contact with the upper exterior layer 116. In some implementations, to facilitate the spacing of sets of conductors depicted in FIG. 2C, the capacitive mat 104 may be formed from a rigid material, such as a printed circuit board (PCB).

Figure 3:
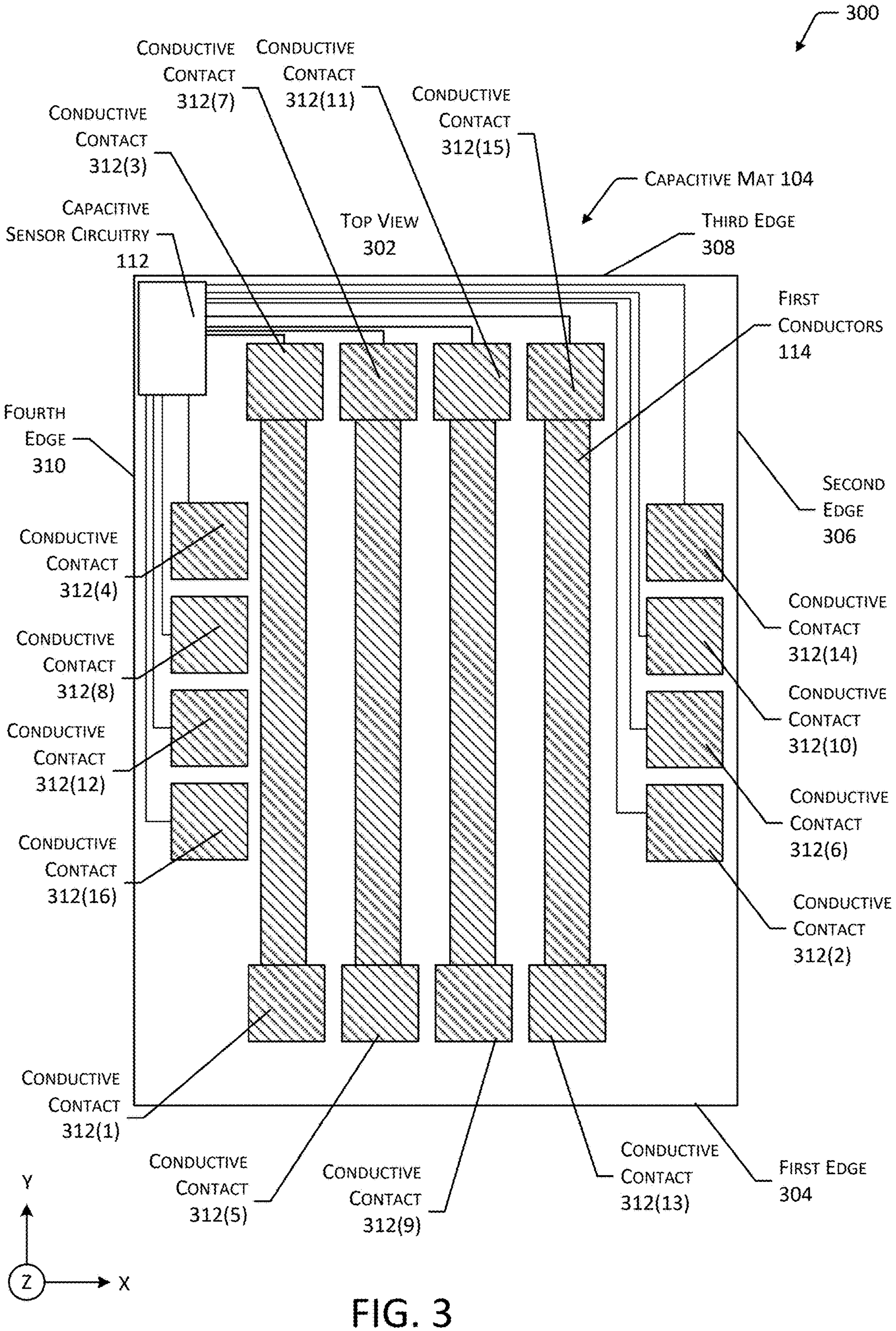
FIG. 3 is a diagram depicting a top view of an implementation of a capacitive mat having features to enable coupling with other capacitive mats.

FIG. 3 is a diagram 300 depicting a top view 302 of an implementation of a capacitive mat 104 having features to enable coupling with other capacitive mats. The features shown in FIG. 3 are not drawn to scale and are intended to illustrate a conceptual arrangement of components within the capacitive mat 104 to facilitate comprehension of the components of the capacitive mat 104. The capacitive mat 104 shown in FIG. 3 has a rectangular shape with a first edge 304 adjacent and perpendicular to a second edge 306, that is adjacent and perpendicular to a third edge 308 opposite the first edge 304, and a fourth edge 310 opposite the second edge 306 that is adjacent and perpendicular to the first edge 304 and third edge 308. In other implementations, the capacitive mat 104 may have other shapes, including round or elliptical shapes, other polygonal shapes, or irregular shapes. As described with regard to FIG. 1, the capacitive mat 104 may include capacitive sensor circuitry 112 connected to a set of first conductors 114 and a set of second conductors 206 (not visible in FIG. 3). As described with regard to FIGS. 1 and 2, the conductors may be placed on a substrate 204, the exterior layers of the capacitive mat 104, or combinations thereof. The capacitive sensor circuitry 112 may be used to provide signals to the conductors to cause the first conductors 114 to function as sensing electrodes and the second conductors 206 to function as shield electrodes, and to determine a capacitance associated with one or more of the electrodes that may be indicative of the position, placement, or removal of an object from a region of the capacitive mat 104.

In the implementation shown in FIG. 3, the capacitive mat 104 may include one or more conductive contacts 312 that may be used to couple the capacitive mat 104 to one or more additional capacitive mats 104. For example, multiple capacitive mats 104 of the same size and shape, or of different sizes and shapes, may be coupled using conductive contacts 312 to enable the coupled mats to cover a shelf 110 or other surface that is larger than a single capacitive mat 104. In some implementations, the conductive contacts 312 may enable capacitive coupling between the capacitive mat 104 and an adjacent capacitive mat 104. For example, the conductive contacts 312 and conductors may be sealed within the capacitive mat 104, while placement of the conductive contacts 312 adjacent to contacts of another mat may capacitively couple the mats. In other implementations, the conductive contact 312 may enable electrical coupling between the conductors of adjacent mats.

FIG. 3 depicts a first conductive contact 312(1) proximate to the first edge 304 of the capacitive mat 104, a second conductive contact 312(2) proximate to the second edge 306 of the capacitive mat 104, a third conductive contact 312(3) positioned proximate to the third edge 308 of the capacitive mat 104, and a fourth conductive contact 312(4) positioned proximate to the fourth edge 310 of the capacitive mat 104, that are each connected to a first conductor. A fifth conductive contact 312(5) proximate to the first edge 304, a sixth conductive contact 312(6) proximate to the second edge 306, a seventh conductive contact 312(7) proximate to the third edge 308, and an eighth conductive contact 312(8) proximate to the fourth edge 310 are connected to a second conductor. A ninth conductive contact 312(9) proximate to the first edge 304, a tenth conductive contact 312(10) proximate to the second edge 306, an eleventh conductive contact 312(11) proximate to the third edge 308, and a twelfth conductive contact 312(12) proximate to the fourth edge 310 are connected to a third conductor. A thirteenth conductive contact 312(13) proximate to the first edge 304, a fourteenth conductive contact 312(14) proximate to the second edge 306, a fifteenth conductive contact 312(15) proximate to the third edge 308, and a sixteenth conductive contact 312(16) proximate to the fourth edge 310 are connected to a fourth conductor.

While FIG. 3 depicts four conductors in the set of first conductors 114 for illustrative purposes, the capacitive mat 104 may include any number of conductors, one or more of which may be connected to corresponding sets of conductive contacts 312 proximate to one or more edges of the capacitive mat 104. Placement of an edge of the capacitive mat 104 adjacent to or overlapping the conductive contacts 312 of a second capacitive mat 104 may couple the conductive contacts 312 of the mats and enable the capacitive sensor circuitry 112 to determine capacitance using conductors on both of the coupled mats. In a similar manner, additional capacitive mats 104 may be coupled to the depicted capacitive mat 104 or to other mats coupled to the depicted capacitive mat 104.

One or more of the conductive contacts 312 may be connected to the capacitive sensor circuitry 112. For example, FIG. 3 depicts the conductive contacts 312 along the second edge 306 (conductive contacts 312(2), 312(6), 312(10), and 312(14)) and the conductive contacts 312 along the fourth edge 310 (conductive contacts 312(4), 312(8), 312(12), and 312(16)) connected to the capacitive sensor circuitry 112. Conductors of adjacent mats that are coupled to these conductive contacts 312 along the second edge 306 or fourth edge 310 may be operated using the capacitive sensor circuitry 112 of the depicted capacitive mat 104 as though the coupled conductors are additional conductors of the depicted capacitive mat 104. In some cases, a gain value, sensitivity value, or other value associated with the capacitive sensor circuitry 112 may be selected to account for signal degradation that may result from conductors coupled to the conductive contacts 312 along the second edge 306 or fourth edge 310. In other cases, the size (e.g., coupling contact area) of the conductive contacts 312 along the second edge 306 or fourth edge 310 or the proximity of the conductive contacts 312 to those of coupled conductors may be selected to compensate for signal degradation.

One or more of the conductive contacts 312 may be connected to the conductors of the capacitive mat 104 rather than to the capacitive sensor circuitry 112. For example, FIG. 3 depicts the conductive contacts 312 along the first edge 304 (conductive contacts 312(1), 312(5), 312(9), and 312(13)) and the conductive contacts along the third edge 308 (conductive contacts 312(3), 312(7), 312(11), and 312(15)) positioned at ends of respective first conductors 114. Conductors of adjacent mats that are coupled to these conductive contacts 312 along the first edge 304 and third edge 308 effectively form a single conductor when coupled with the conductor of the depicted conductive mat 104, such that the capacitive sensor circuitry 112 may be used to operate this larger conductor. In some cases, a gain value, sensitivity value, or other value associated with the capacitive sensor circuitry 112 may be selected to account for signal degradation that may result from the extended length of these conductors. In other cases, the size of conductive contacts 312, the proximity of conductive contacts 312, or the width of the conductors in the depicted capacitive mat 104 or a second mat coupled to the depicted capacitive mat 104 may be selected to compensate for signal degradation.

Figure 4:
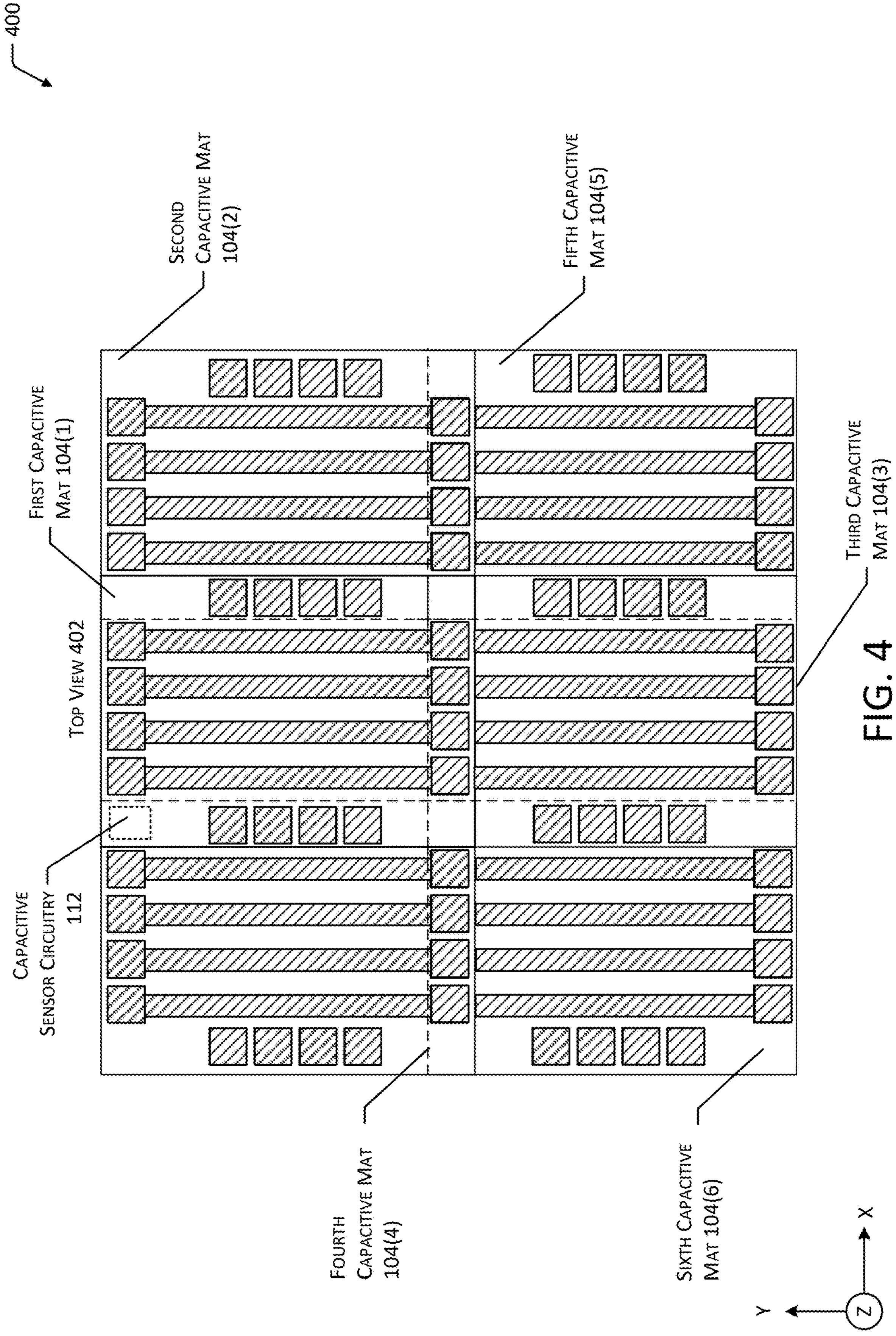
FIG. 4 is a diagram depicting a top view of an implementation of an arrangement of multiple capacitive mats that are coupled together.

FIG. 4 is a diagram 400 depicting a top view 402 of an implementation of an arrangement of multiple capacitive mats 104 that are coupled together. As described with regard to FIG. 3, a first capacitive mat 104(1) may have conductive contacts 312 proximate to one or more edges of the capacitive mat 104(1). In other implementations, conductive contacts 312 may be distributed between the conductors located near the edges of the mat, which may enable the conductive contacts 312 to occupy a larger area to enable greater capacitance or facilitate coupling between mats. An edge of a second capacitive mat 104(2) may be placed in an overlapping, abutting, or cascading arrangement such that conductive contacts 312 at an edge of the second capacitive mat 104(2) are proximate to conductive contacts 312(2) at an edge of the first capacitive mat 104(1), causing capacitive coupling between the conductors of the first capacitive mat 104(1) and the conductors of the second capacitive mat 104(2). In some implementations, the second capacitive mat 104(2) may lack capacitive sensor circuitry 112, or capacitive sensor circuitry 112 of the second capacitive mat 104(2) may be present but unused, and the capacitive sensor circuitry 112 of the first capacitive mat 104(1) may be used to determine capacitances associated with both the first capacitive mat 104(1) and the second capacitive mat 104(2). A gain value, sensitivity value, or other value associated with the capacitive sensor circuitry 112 may be selected to apply or receive greater signals associated with the second capacitive mat 104(2) due to a greater distance between the capacitive sensor circuitry 112 and the second capacitive mat 104(2) when compared to the distance between the capacitive sensor circuitry 112 and the first capacitive mat 104(1).

In a similar manner, a third capacitive mat 104(3) may be placed in association with a different edge of the first capacitive mat 104(1) to couple conductive contacts 312 of the third capacitive mat 104(3) with adjacent conductive contacts 312 of the first capacitive mat 104(1). A fourth capacitive mat 104(4) is similarly shown in association with a different edge of the first capacitive mat 104(1) to couple conductive contacts 312 of the fourth capacitive mat 104(4) with conductive contacts 312 of the first capacitive mat 104(1). The capacitive sensor circuitry 112 of the first capacitive mat 104(1) may similarly be used to operate electrodes and determine capacitance associated with the third capacitive mat 104(3) and the fourth capacitive mat 104(4).

Capacitive mats 104 that are coupled to the first capacitive mat 104(1) may also have conductive contacts 312 along edges thereof, which may be used to couple to additional capacitive mats 104. For example, FIG. 4 depicts a fifth capacitive mat 104(5) having edges adjacent to those of the second capacitive mat 104(2) and the third capacitive mat 104(3) to enable coupling between conductive contacts 312 of adjacent mats. In some implementations, the fifth capacitive mat 104(5) may couple with both the second capacitive mat 104(2) and the third capacitive mat 104(3). In other implementations, the fifth capacitive mat 104(5) may couple with one of the second capacitive mat 104(2) and or third capacitive mat 104(3). In a similar manner, a sixth capacitive mat 104(6) is shown having edges adjacent to the third capacitive mat 104(3) and the fourth capacitive mat 104(4) to enable coupling between conductive contacts 312 at the edges of the adjacent mats. The capacitive sensor circuitry 112 of the first capacitive mat 104(1) may be used to operate electrodes and determine capacitance associated with the fifth capacitive mat 104(5) and the sixth capacitive mat 104(6). The gain value, sensitivity value, or other value associated with the capacitive sensor circuitry 112 may be selected to apply or receive greater signals associated with the fifth capacitive mat 104(5) and the sixth capacitive mat 104(6) based on the distance between the capacitive sensor circuitry 112 and the corresponding capacitive mat 104.

Figure 5A:
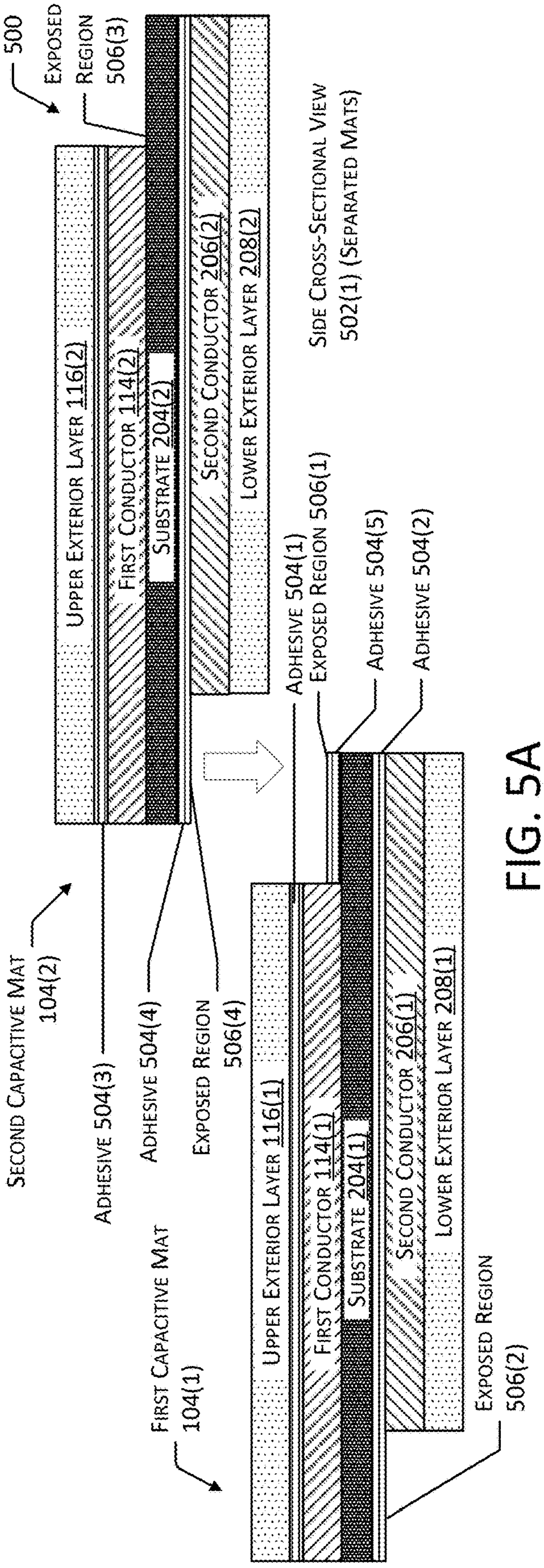
Figure 5B:
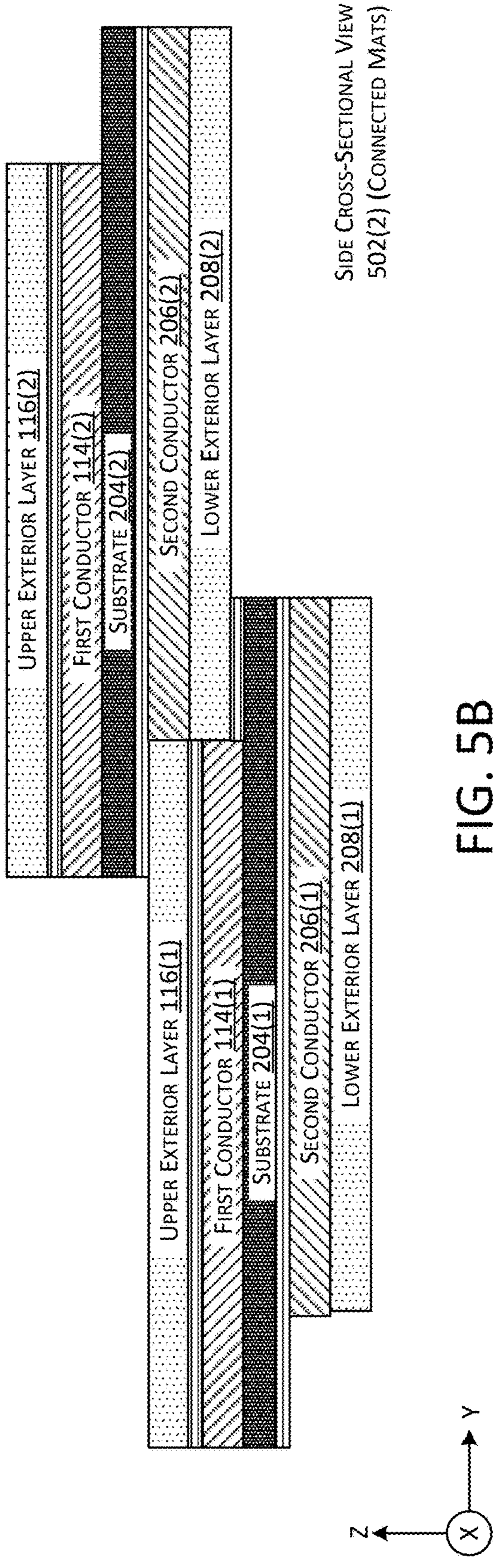

FIGS. 5A-5D are diagrams 500 depicting side cross-sectional views 502 of implementations of capacitive mats 104 that may be coupled with other capacitive mats 104. FIG. 5A depicts a first side cross-sectional view 502(1) of a first capacitive mat 104(1) and second capacitive mat 104(2) in an uncoupled configuration, having an arrangement of components that may be coupled together. FIG. 5B depicts a second side cross-sectional view 502(2) of the first capacitive mat 104(1) and second capacitive mat 104(2) coupled together.

The first capacitive mat 104(1) may include a substrate 204(1) having one or more first conductors 114(1) positioned thereon. As shown in FIG. 5A, the substrate 204(1) may have a dimension greater than a corresponding dimension of the first conductor 114(1) such that a portion of the substrate 204(1) extends beyond the end of the first conductor 114(1), defining a first exposed region 506(1) of the substrate 204(1) that may be positioned adjacent to a portion of the second capacitive mat 104(2) when the mats are coupled together. An upper exterior layer 116(1) may be placed over the first conductor 114(1), and in some implementations, may be secured using one or more adhesives 504(1), as shown in FIG. 5A.

One or more second conductors 206(1) may be positioned on the side of the substrate 204(1) opposite the first conductor 114(1). For example, the second conductor 206(1) may be applied to the substrate 204(1) or to a lower exterior layer 208(1) positioned below the second conductor 206(1). Continuing the example, FIG. 5A depicts the second conductor 206(1) positioned adjacent to the lower exterior layer 208(1) and secured to the substrate 204(1) using one or more adhesives 504(2). As shown in FIG. 5A, the substrate 204(1) may have a dimension greater than a corresponding dimension of the second conductor 206(1) such that a portion of the substrate 204(1) extends beyond the end of the second conductor 206(1) to define a second exposed region 506(2) of the substrate 204(1). As shown in FIG. 5A, the first exposed region 506(1) and second exposed region 506(2) may be on opposite edges of the first capacitive mat 104(1). In a similar manner, the exposed regions 506 may extend along the edges of the first capacitive mat 104(1) that are perpendicular to the edges shown in FIG. 5A.

The second capacitive mat 104(2) may have an identical or similar arrangement of components as that described with regard to the first capacitive mat 104(1). For example, FIG. 5A depicts the second capacitive mat 104(2) having a first conductor 114(2) adjacent to a substrate 204(2) and an upper exterior layer 116(2) positioned over the first conductor 114(2) and secured using one or more adhesives 504(3). The substrate 204(2) may have a dimension greater than a corresponding dimension of the first conductor 114(2) to define an exposed region 506(3) that may be placed adjacent to a corresponding exposed region 506 of an adjacent capacitive mat 104 when coupling the second capacitive mat 104(2) to an adjacent mat. A second conductor 206(2) may be positioned adjacent a lower exterior layer 208(2) on a side of the substrate 204(2) opposite the side on which the first conductor 114(2) is positioned. As shown in FIG. 5A, in some implementations, the second conductor 206(2) may be secured to the substrate 204(2) using one or more adhesives 504(4). The substrate 204(2) may have a dimension larger than a corresponding dimension of the second conductor 206(2) to define an exposed region 506(4) that may be placed adjacent to the exposed region 506(1) of the first capacitive mat 104(1) when coupling the first capacitive mat 104(1) to the second capacitive mat 104(2). The exposed region 506(1) of the first capacitive mat 104(1) may include one or more adhesives 504(5) for securing the first capacitive mat 104(1) relative to the second capacitive mat 104(2).

As shown in FIG. 5B, positioning the exposed region 506(4) of the second capacitive mat 104(2) adjacent to the exposed region 506(1) of the first capacitive mat 104(1) may cause the associated mats to function as a single capacitive mat 104, such as when using multiple capacitive mats 104 to cover a shelf 110 or other surface that is larger than a single capacitive mat 104. As described with regard to FIG. 4, capacitive sensor circuitry 112 in a particular capacitive mat 104 may be used to operate electrodes and determine capacitance associated with other capacitive mats 104. For example, placement of the first capacitive mat 104(1) and second capacitive mat 104(2) in the configuration shown in FIG. 5B may position conductive contacts 312 proximate to an edge of the first capacitive mat 104(1) adjacent to conductive contacts 312 proximate to the adjacent edge of the second capacitive mat 104(2), enabling capacitive or electrical coupling between the conductors of the first capacitive mat 104(1) and the second capacitive mat 104(2). In some implementations, the adhesive 504(4) associated with the exposed region 506(4) of the second capacitive mat 104(2) and the adhesive 504(5) associated with the exposed region 506(1) of the first capacitive mat 104(1) may adhesively engage the second capacitive mat 104(2) to the first capacitive mat 104(1). In other implementations, one or more separate adhesive materials may be used. As described with regard to FIG. 4, other capacitive mats 104 may be engaged with the first capacitive mat 104(1) and second capacitive mat 104(2) in a similar manner to that shown in FIGS. 5A and 5B.

FIG. 5C depicts a third side cross-sectional view 502(3) of an implementation of a first capacitive mat 104(3) and a second capacitive mat 104(4) in an uncoupled configuration, having an arrangement of components that may be coupled together. FIG. 5D depicts a fourth side cross-sectional view 502(4) of the first capacitive mat 104(3) and second capacitive mat 104(4) of FIG. 5C coupled together. The first capacitive mat 104(3) may have one or more first conductors 114(3) positioned on a first side of a substrate 204(3) and a second conductor 206(3) on a second side of the substrate 204(3) opposite the first side. An upper exterior layer 116(3) may be positioned over the first conductor 114(3), such that the first conductor 114(3) is between the upper exterior layer 116(3) and the substrate 204(3). The first conductor 114(3) may have a dimension greater than a corresponding dimension of the substrate 204(3), such that an exposed region of the first conductor 114(3), or a layer of material placed over the first conductor 114(3), extends beyond an end of the substrate 204(3) for engagement with an exposed region of an adjacent capacitive mat 104. One or more adhesives 504(5) may be placed on the exposed region to adhesively secure the first capacitive mat 104(3) to an adjacent capacitive mat 104. A lower exterior layer 208(3) may be placed below the second conductor 206(3) such that the second conductor 206(3) is between the lower exterior layer 208(3) and the substrate 204(3). The second conductor 206(3) may have a dimension greater than a corresponding dimension of the substrate 204(3), such that an exposed region of the second conductor 206(3), or a layer of material placed over the second conductor 206(3), extends beyond an end of the substrate 204(3) for engagement with an exposed region of the second capacitive mat 104(4). One or more adhesives 504(6) may be placed on the exposed region to adhesively secure the first capacitive mat 104(3) to the second capacitive mat 104(4). As shown in FIG. 5C, the exposed regions of the conductors having adhesives 504 may be on opposite edges of the first capacitive mat 104(3). In a similar manner, the exposed regions may extend along the edges of the first capacitive mat 104(3) that are perpendicular to the edges shown in FIG. 5C.

The second capacitive mat 104(4) may have an identical or similar arrangement of components as that described with regard to the first capacitive mat 104(3). For example, FIG. 5C depicts the second capacitive mat 104(4) having a first conductor 114(4) adjacent to a substrate 204(4) and an upper exterior layer 116(4) positioned over the first conductor 114(4). The first conductor 114(4) may have a dimension greater than a corresponding dimension of the substrate 204(4) to define an exposed region with one or more adhesives 504(7) that may be placed adjacent to a corresponding exposed region of the first capacitive mat 104(3) coupling the second capacitive mat 104(4) to the first capacitive mat 104(3). A second conductor 206(4) may be positioned adjacent to the substrate 204(4) opposite the side on which the first conductor 114(4) is positioned. The second conductor 206(4) may have a dimension larger than a corresponding dimension of the substrate 204(4) to define an exposed region having one or more adhesives 504(8) that may be placed adjacent to a corresponding exposed region of an adjacent capacitive mat 104 to couple the capacitive mats 104 together.

As shown in FIG. 5D, the first capacitive mat 104(3) and second capacitive mat 104(4) may be positioned adjacent to one another to enable both mats to function as a single capacitive mat 104, such as when using multiple capacitive mats 104 to cover a shelf 110 or other surface that is larger than a single capacitive mat 104. As described with regard to FIG. 4, capacitive sensor circuitry 112 in a particular capacitive mat 104 may be used to operate electrodes and determine capacitance associated with other capacitive mats 104. For example, placement of the first capacitive mat 104(3) and second capacitive mat 104(4) in the configuration shown in FIG. 5D may position conductive contacts 312 proximate to an edge of the first capacitive mat 104(3) adjacent to conductive contacts 312 proximate to the adjacent edge of the second capacitive mat 104(4), enabling capacitive or electrical coupling between the conductors of the first capacitive mat 104(3) and conductors of the second capacitive mat 104(4). In some implementations, the adhesive 504(6) associated with the first capacitive mat 104(3) and the adhesive 504(7) associated with the second capacitive mat 104(4) may prevent relative movement between the engaged capacitive mats 104. As described with regard to FIG. 4, other capacitive mats 104 may be engaged with the first capacitive mat 104(3) and second capacitive mat 104(4) in a similar manner to that shown in FIGS. 5C and 5D.

Figure 6:
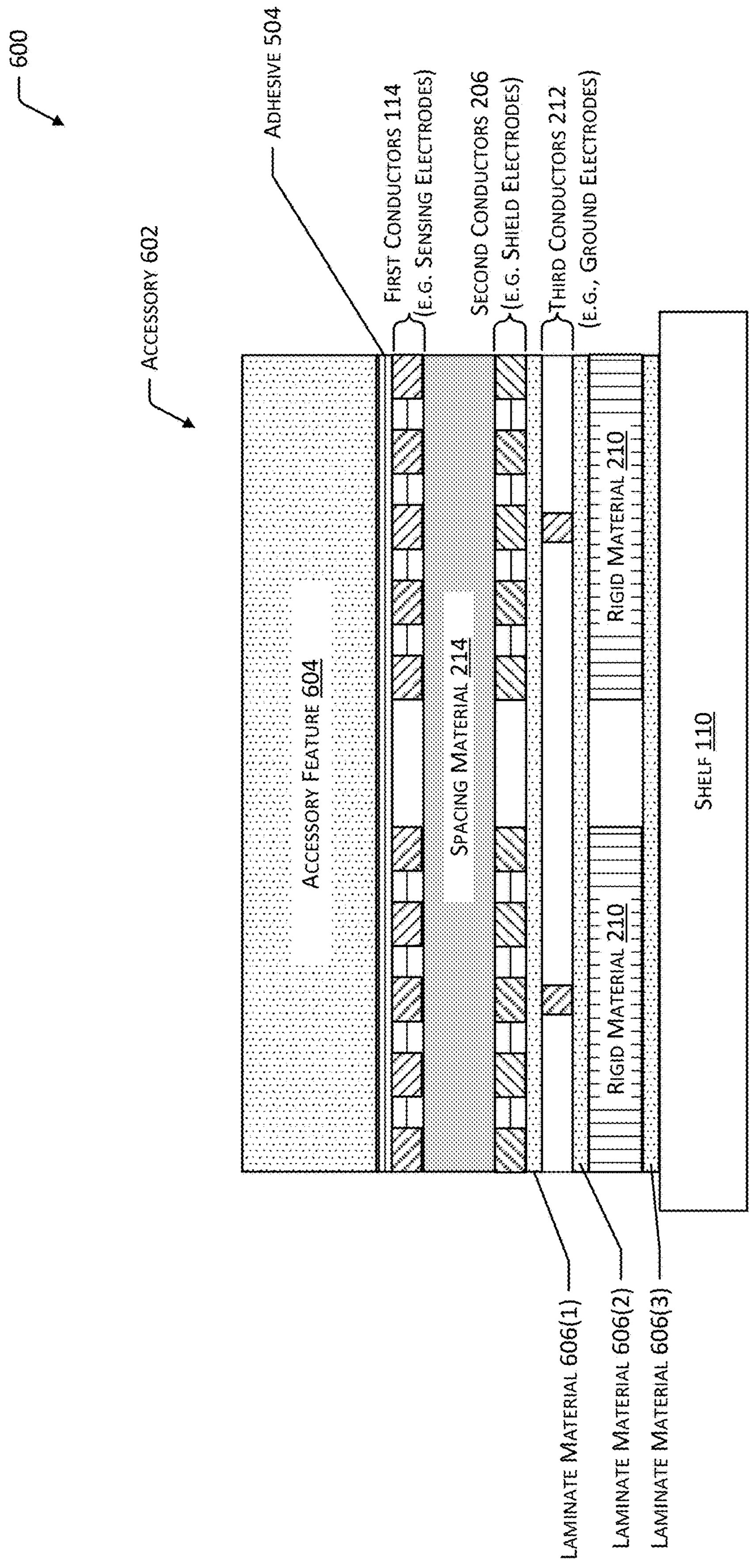
FIG. 6 is a diagram depicting a side cross-sectional view of the components of a capacitive mat integrated with an accessory.

FIG. 6 is a diagram 600 depicting a side cross-sectional view of the components of a capacitive mat 104 integrated with an accessory 602. An accessory 602 may include an accessory feature 604, such as a container, pusher, dispenser, or other device that may be integrated with other components of a capacitive mat 104 and placed on a shelf 110. The accessory 602 may be used to arrange, contain, or dispense, items 106. The components of a capacitive mat 104 may be removably secured to a lower side of the accessory 602, or permanently secured (e.g., adhered or clipped) to the accessory 602, which may then be placed against a supporting surface, such as a shelf 110. A capacitance associated with conductors in the capacitive mat components secured to the accessory 602 may be determined and used to determine placement of an item 106 in association with the accessory 602, removal of an item 106 from the accessory 602, and so forth. In some implementations, the capacitive mat components may be secured to the accessory 602 using one or more adhesives 504. In other implementations, one or more components may be integral with the accessory 602. For example, one or more first conductors 114 may be integrally formed in the body of the accessory 602, such as from a conductive plastic.

In some implementations, a layer of rigid material 210 may be positioned between the third conductors 212 and a shelf 110 or other surface on which the accessory 602 and capacitive mat components are placed. For example, a first layer of laminate material 606(1) may separate the second conductors 206 from the third conductors 212, a second layer of laminate material 606(2) may separate the third conductors 212 from the rigid material 210, and a third layer of laminate material 606(3) may function as an exterior layer that separates the rigid material 210 from an underlying surface, such as a shelf 110. The rigid material 210 may limit movement of the conductors relative to the underlying surface and to other conductors. In some implementations, the rigid material 210 may electrically isolate the conductors from an underlying conductive surface, such as a metal shelf 110. For example, use of a conductive material, such as copper, may affect the electrical field associated with the conductors. While FIG. 6 depicts an example implementation in which two sets of five conductors are shown, in other implementations, a single conductor having the width of a set of conductors may be used. In still other implementations, a single conductor having a width that is narrower than that of the set of conductors may be used. In other implementations, sets of conductors having more of fewer electrodes may be used.

FIG. 6 depicts the first conductors 114 and second conductors 206 each including sets of five conductors that are separated by a gap, with a single third conductor 212 that is smaller than the first conductors 114 and second conductors 206 positioned centrally beneath the first conductors 114 and second conductors 206. This arrangement of conductors may facilitate generation of an electrical field that may detect placement or removal of objects relative to the accessory 602, while reducing the propensity for external moisture to impair determination of capacitance values associated with the conductors.

FIG. 6 depicts an implementation in which an accessory 602 includes an accessory feature 604 connected to components of a capacitive mat 104 such as the first conductors 114, second conductors 206, third conductors 212, rigid material 210, and laminate layers 606, which may be placed on an underlying surface such as a shelf 110. In other implementations, one or more components of the capacitive mat 104 may be placed on or connected to a shelf 110 rather than integrated with the accessory feature 604. For example, the first conductors 114 may be connected to the accessory feature 604 while the second conductors 206 are connected to the shelf 110, such that placement of the accessory feature 604 and connected first conductors 114 on the shelf 110 and connected second conductors 206 may enable a capacitance associated with the first conductors 114 and second conductors 206 to be determined based on placement or removal of items relative to the accessory feature 604.

Those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A mat for determining position of an object relative to a surface, the mat comprising:
- capacitive sensor circuitry;
- a flexible substrate having a first side and a second side opposite the first side, wherein the substrate is formed from a non-conductive material;
- a first set of conductors on the first side of the substrate, wherein the first set of conductors is connected to the capacitive sensor circuitry;
- a second set of conductors on the second side of the substrate, wherein the second set of conductors is connected to the capacitive sensor circuitry;
- a flexible upper exterior covering for placement of the object, wherein the first set of conductors is between the flexible upper exterior covering and the substrate; and
- a flexible lower exterior covering for placement on the surface, wherein the second set of conductors is between the flexible lower exterior covering and the substrate;
- wherein the capacitive sensor circuitry is configured to:
  - determine a capacitance associated with a first conductor of the first set of conductors and a second conductor of the second set of conductors associated with a region of the flexible upper exterior covering that encompasses the first conductor and the second conductor; and
  - generate output indicative of the capacitance.

2. The mat of claim 1, wherein:
- the capacitance is determined by applying one or more signals to the first set of conductors and the second set of conductors to cause the first set of conductors to function as sensing electrodes and to cause the second set of conductors to function as shield electrodes;
- the capacitive sensor circuitry is further configured to determine a ground reference value associated with the second set of conductors; and
- the capacitance is determined based in part on the ground reference value.

3. The mat of claim 1, wherein the first set of conductors and the second set of conductors comprise carbon electrodes having a thickness greater than or equal to one micron.

4. A system comprising:
- a mat comprising:
  - capacitive sensor circuitry;
  - a substrate having a first side and a second side opposite the first side;
  - a first conductor on the first side of the substrate, wherein the first conductor is connected to the capacitive sensor circuitry; and
  - a second conductor on the second side of the substrate, wherein the second conductor is connected to the capacitive sensor circuitry;
- wherein the capacitive sensor circuitry is configured to determine a capacitance associated with the first conductor and the second conductor, and wherein the capacitance is associated with a region of the mat.

5. The system of claim 4, further comprising:
- a surface comprising an electrically conductive material, wherein the mat is placed on the surface; and
- wherein the mat further comprises:
  - a first outer layer positioned adjacent to the first conductor, wherein the first conductor is positioned between the first outer layer and the substrate, and wherein the region encompasses the first conductor; and
  - a second outer layer positioned adjacent to the second conductor, wherein the second conductor is positioned between the second outer layer and the substrate;
- wherein the second outer layer is positioned in contact with the surface.

6. The system of claim 5, further comprising an accessory that comprises the first outer layer and the first conductor, wherein the capacitance is associated with one or more of placement of one or more objects relative to the accessory or removal of the one or more objects relative to the accessory.

7. The system of claim 5, wherein the second outer layer is adhesively secured to the surface, and the capacitive sensor circuitry is further configured to determine a ground reference value associated with the surface.

8. The system of claim 5, wherein the second outer layer is non-adhesively positioned in contact with the surface, the mat further comprising:
- a layer of rigid material between the second conductor and the second outer layer, wherein the layer of rigid material limits movement of the second conductor relative to the surface.

9. The system of claim 5, further comprising:
- one or more weight sensors associated with the surface, wherein the one or more weight sensors determine at least one weight value associated with an object on the surface;
- one or more non-transitory memories storing computer-executable instructions; and
- one or more hardware processors to execute the computer-executable instructions to:
  - determine, based on the at least one weight value and the capacitance, one or more characteristics indicative of the object on the mat.

10. The system of claim 4, further comprising:
- an adhesive associated with the substrate, wherein the adhesive limits relative movement between the first conductor and the second conductor.

11. The system of claim 4, wherein:

the capacitance is determined by applying one or more signals to the first conductor and the second conductor to cause the first conductor to function as a sensing electrode and the second conductor to function as a shield electrode;

the capacitive sensor circuitry is further configured to determine a ground reference value associated with the second conductor; and the capacitance is determined based in part on the ground reference value.

12. The system of claim 4, further comprising:

a third conductor;

wherein:

the second conductor is between the first conductor and the third conductor, the third conductor functions as a ground electrode, and a first distance between the first conductor and the third conductor causes an electrical field associated with the first conductor to extend a second distance from the mat to detect a second object above a first object; and wherein:

the capacitance is determined by applying one or more signals to the first conductor and the second conductor to cause the first conductor to function as a sensing electrode and the second conductor to function as a shield electrode;

the capacitive sensor circuitry is further configured to determine a ground reference value associated with the third conductor; and the capacitance is determined based in part on the ground reference value.

13. A system comprising:

a first mat having at least a first edge and a second edge, the first mat comprising:

capacitive sensor circuitry;

a first conductor connected to the capacitive sensor circuitry;

a second conductor connected to the capacitive sensor circuitry;

a first conductive contact positioned at the first edge, wherein the first conductive contact is connected to at least a first of the first conductor or the second conductor; and a second conductive contact positioned at the second edge, wherein the second conductive contact is connected to at least a second of the first conductor or the second conductor;

wherein the capacitive sensor circuitry is configured to determine a first capacitance associated with the first conductor and the second conductor, and wherein the first capacitance is associated with a first region of the first mat.

14. The system of claim 13, further comprising:

a second mat having at least a third edge, the second mat comprising:

a third conductor;

a fourth conductor; and a third conductive contact positioned at the third edge, wherein the third conductive contact is connected to at least one of the third conductor or the fourth conductor;

wherein the third conductive contact is coupled with the first conductive contact; and wherein the capacitive sensor circuitry is further configured to determine a second capacitance associated with the third conductor and the fourth conductor, and wherein the second capacitance is associated with a second region of the second mat.

15. The system of claim 14, wherein the first conductive contact is coupled to the third conductive contact using capacitive coupling.

16. The system of claim 14, wherein:

the first mat further comprises a first outer layer positioned over the first conductor, wherein the first outer layer does not extend over the first conductive contact; and the second mat further comprises a second outer layer positioned over the third conductor, wherein the second outer layer does not extend over the third conductive contact.

17. The system of claim 16, further comprising an accessory that comprises the first outer layer and the first conductor, wherein the first capacitance is associated with one or more of placement of the accessory relative to a surface, removal of the accessory from the surface, placement of one or more objects relative to the accessory, or removal of the one or more objects relative to the accessory.

18. The system of claim 14, further comprising an adhesive material positioned on at least a portion of at least one of the first edge or the third edge.

19. The system of claim 14, further comprising:

a third mat having at least a fourth edge, the third mat comprising:

a fifth conductor;

a sixth conductor; and a fourth conductive contact positioned at the fourth edge, wherein the fourth conductive contact is connected to at least one of the fifth conductor or the sixth conductor;

wherein the fourth conductive contact is coupled with the second conductive contact; and wherein the capacitive sensor circuitry is further configured to determine a third capacitance associated with the fifth conductor and the sixth conductor, and wherein the third capacitance is associated with a third region of the third mat.

20. The system of claim 14, wherein the second mat further comprises:

a fourth edge;

a fourth conductive contact positioned at the fourth edge, wherein the fourth conductive contact is connected to at least one of the third conductor or the fourth conductor; and the system further comprising:

a third mat having at least a fifth edge, the third mat comprising:

a fifth conductor;

a sixth conductor; and a fifth conductive contact positioned at the fifth edge, wherein the fifth conductive contact is connected to at least one of the fifth conductor or the sixth conductor;

wherein the fifth conductive contact is coupled with the fourth conductive contact; and wherein the capacitive sensor circuitry is further configured to determine a third capacitance associated with the fifth conductor and the sixth conductor, and wherein the third capacitance is associated with a third region of the third mat.

* * * * *